Patented July 25, 1933

1,919,723

UNITED STATES PATENT OFFICE

JULIUS HYMAN, OF CHICAGO, ILLINOIS, ASSIGNOR TO VELSICOL CORPORATION, A CORPORATION OF ILLINOIS

MANUFACTURE OF PRODUCTS CONTAINING OXYGEN-ABSORBING MINERAL HYDROCARBON POLYMERS

No Drawing. Application filed April 27, 1933. Serial No. 668,291.

This invention relates generally to the manufacture of products containing mineral hydrocarbons capable of oxidizing to form films, and is a continuation in part of my copending application, Serial No. 494,204, filed November 7, 1930. In a more specific embodiment, my invention refers to the manufacture of paints and varnishes, baking finishes, waterproofing, impregnating, saturating and coating materials, linoleums, patent leathers, printing and lithographic inks, leather dressings, core oils, permanent transparencies and numerous other similar products containing, in part, mineral hydrocarbons which dry by oxidation, in the manner of the drying oils.

Heretofore hydrocarbon bodies have been used extensively in the preparation of the aforementioned products as solvents, plasticizers, diluents and extenders, these hydrocarbons possessing little or no oxidizing properties. Other hydrocarbons have been suggested as resins and as drying oils. In this latter class, however, the hydrocarbons either oxidized slowly, if at all, or required the addition of metallic driers or blowing or both, to speed up the solidifying process to a point where the use of the product would be practicable. For example, mineral hydrocarbons heretofore produced by polymerization of vapor phase cracked gasoline, which had previously been partially refined by a moderate polymerization and separation step, have markedly different characteristics from those contemplated in the present product and are unsuitable for the present purpose.

It has been found that when highly unsaturated mineral hydrocarbons such as are found in unrefined vapor phase cracked gasoline are brought into contact, preferably in vapor phase, with active contact masses such as fuller's earth, active clay, silica gel and the like, the most active hydrocarbons are polymerized to heavy mineral hydrocarbons possessing marked drying properties, that is, compounds capable of removing oxygen from the air and thereby rapidly forming solid, dry films whose solubility in petroleum solvents decreases as the oxidation increases. The materials whose use is contemplated in the present invention are polymers formed by the moderate action of active contact masses or dilute sulfuric acid or unrefined vapor phase gasoline, such polymerization with contact masses occurring in the liquid or vapor phase, or with dilute sulfuric acid in the liquid phase. Such a reaction may be carried on at temperatures ranging from 150° F. to 650° F. for contact masses, and from ordinary temperatures to 200° F. for dilute sulfuric acid, the reaction time being so regulated that the resulting polymers when reduced by steam or vacuum distillation to about a 50% solid content as determined by the standard A. S. T. M. method for varnish testing, possess a Wijs iodine number (0.13–0.14 grams of sample being used in the test) of not less than 150 and dry dust-free in less than one-fourth the time required by raw linseed oil. It will in general be found that an increase in reaction time or in reaction temperature or acid concentration will decrease the iodine number and increase the drying time of a material such as described above. As one specific example of the process of deriving applicant's novel product, crude oil is vaporized by heat and the vapors then subjected to cracking at approximately 1100° F. at substantially atmospheric pressure. The vapors are then fractionated to separate heavier ends, the remaining gasoline vapors then being brought without further refining steps into contact with an active contact mass such as active clay to cause polymerization of the most unsaturated portions of the gasoline. In this polymerizing step the reaction time and temperature are regulated as indicated above to produce polymers of the desired characteristics. The polymers may then be separated from the gasoline by condensation or fractionation and are fractionated, preferably by steam or vacuum distillation, if it is desired to produce polymers of greater non-volatile content. The resulting polymers may then be incorporated with vegetable drying oils or other varnish or paint adjuvants to form applicant's products.

It is to be clearly understood, however, that the use of polymers derived from unrefined vapor phase gasoline is not to be limited to any one viscosity or non-volatile content, but aims to include any fraction or residue thereof possessing the property of absorbing oxygen from the air in the process of film formation.

By "unrefined vapor phase cracked gasoline" is meant a vapor phase cracked gasoline in which the quantity and quality of unsaturated hydrocarbons have not been sensibly altered by any refining steps taken subsequently to the cracking operation and the fractionation or condensation step necessary to separate the gasoline from residual material.

Polymers whose use is herein contemplated often possess iodine numbers in excess of 200 and often dry dust-free within two to four hours. Certain fractions of these polymers have occasionally been found to possess iodine numbers in excess of 300.

It is the primary object of the present invention to provide products of the character referred to, containing as one constituent a mineral hydrocarbon material of the type heretofore described. Such products may generally be produced by admixing with these oxidizing materials varying amounts of raw or bodied vegetable or marine drying or semi-drying oils, metallic driers, resins and/or thinners, the quantities and states of these materials depending on the nature and properties of the product desired. Other materials, such as pigments, may be added if required, or the previously mentioned materials may be deleted, when necessary. Also the vegetable or marine drying oils may be bodied in the presence of the polymerized mineral hydrocarbons previously referred to. The many possible formulations for the coatings and impregnants originally referred to make special formulas superfluous. The object of this invention is to provide for all formulations of coatings and impregnants containing as one constituent a polymerized mineral hydrocarbon or fraction or residue therefrom obtained by the polymerization of unrefined vapor phase cracked gasoline to produce a product whose limiting constants have been described earlier in this specification.

I claim as my invention:

1. A coating or impregnant containing a varnish or paint adjuvant and a hydrocarbon polymer of mineral origin resulting from the polymerization of unrefined vapor phase cracked gasoline, said hydrocarbon having an iodine number above 150 and drying in less than one fourth the time required by raw linseed oil when said polymer is reduced to approximately a 50% non-volatile content.

2. A coating or impregnant containing a vegetable or marine drying oil and a hydrocarbon polymer of mineral origin resulting from the polymerization of unrefined vapor phase cracked gasoline, said hydrocarbon having an iodine number above 150 and drying in less than one fourth the time required by raw linseed oil when said polymer is reduced to approximately 50% non-volatile content.

3. A coating or impregnant comprising a varnish or paint adjuvant and a hydrocarbon polymer of mineral origin resulting from the polymerization of unrefined vapor phase cracked gasoline, said hydrocarbon having an iodine number above 150 and drying in less than one fourth the time required by raw linseed oil when said polymer is reduced to approximately 50% non-volatile content.

4. A coating or impregnant containing a varnish or paint adjuvant and a hydrocarbon polymer of mineral origin resulting from the polymerization of unrefined vapor phase cracked gasoline, said hydrocarbon having an iodine number above 150 and capable of combining with the oxygen of the air at ordinary temperatures to dry in less than one fourth the time required by raw linseed oil when said polymer is reduced to approximately a 50% non-volatile content.

5. A coating or impregnant containing a vegetable or marine drying oil and a hydrocarbon polymer of mineral origin resulting from the polymerization of unrefined vapor phase cracked gasoline, said hydrocarbon having an iodine number above 150 and capable of combining with the oxygen of the air at ordinary temperatures to dry in less than one fourth the time required by raw linseed oil when said polymer is reduced to approximately 50% non-volatile content.

6. A coating or impregnant containing a vegetable or marine drying oil and a polymerized mineral hydrocarbon produced by the action of active contact masses on unrefined vapor phase cracked gasoline in the vapor phase at temperatures between 150° F. and 650° F., said polymers when reduced to approximately 50% non-volatile content, possessing an iodine number not less than 150 and a drying time less than one fourth that of raw linseed oil.

7. A coating or impregnant containing a vegetable or marine drying oil and a polymerized mineral hydrocarbon produced by the action of active contact masses on unrefined vapor phase cracked gasoline in the liquid phase at temperatures between 150° F. and 650° F., said polymers when reduced to approximately 50% non-volatile content, possessing an iodine number not less than 150 and a drying time less than one fourth that of raw linseed oil.

8. A coating or impregnant containing a vegetable or marine drying oil and a polymerized mineral hydrocarbon produced by the action of dilute sulfuric acid upon unrefined vapor phase cracked gasoline in the liquid phase at temperatures between ordinary temperature and 200° F., said polymers when reduced to approximately 50% non-volatile content, possessing an iodine number not less than 150 and a drying time less than one fourth that of raw linseed oil.

9. A coating or impregnant containing a varnish or paint adjuvant and a hydrocarbon polymer of mineral origin resulting from the polymerization of unrefined vapor phase cracked gasoline, said hydrocarbon having an iodine number above 150 and drying in less than one fourth the time required by raw linseed oil.

JULIUS HYMAN.